June 5, 1951 — H. V. REED — 2,555,860
TRANSMISSION OPERATED CONTROL OF CENTRIFUGAL CLUTCH MECHANISM
Filed Oct. 20, 1945 — 2 Sheets-Sheet 2
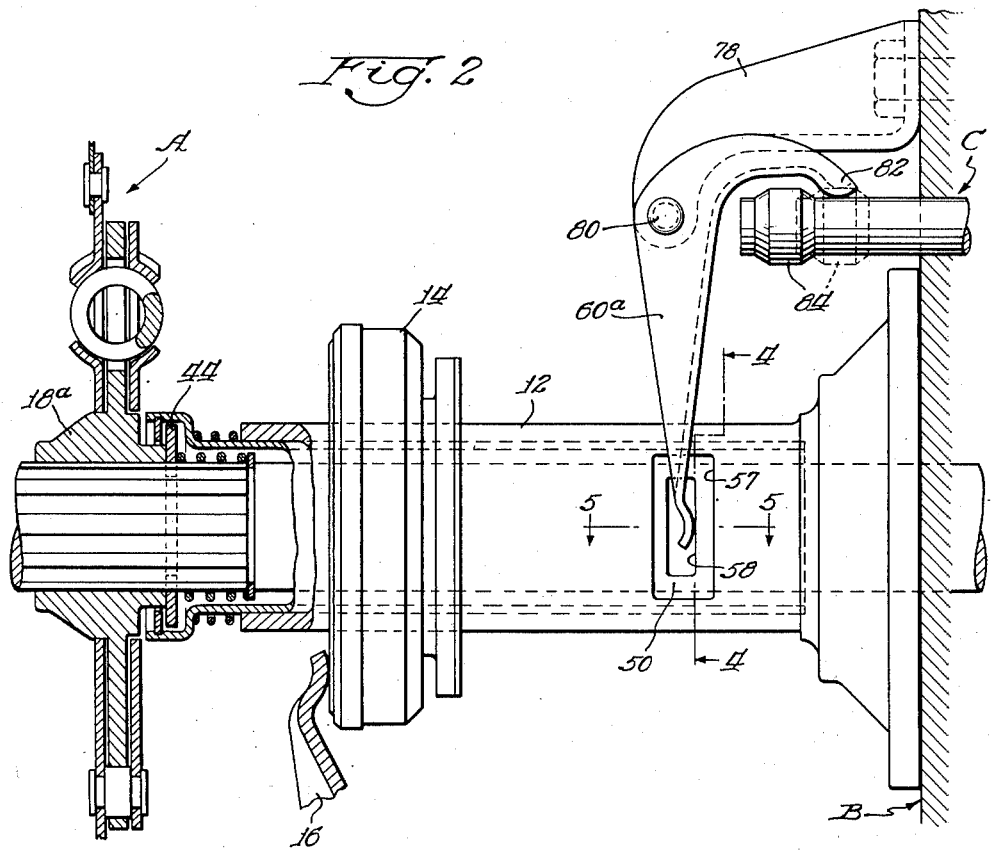
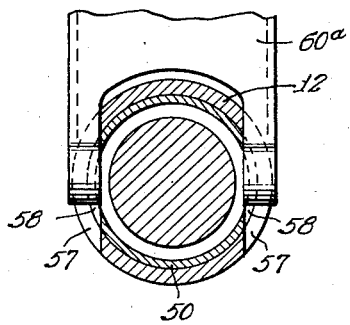
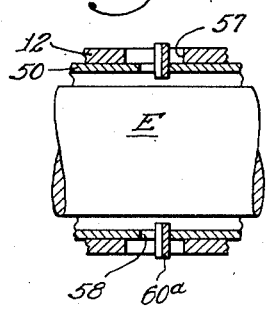
Inventor:
Harold V. Reed Patented June 5, 1951

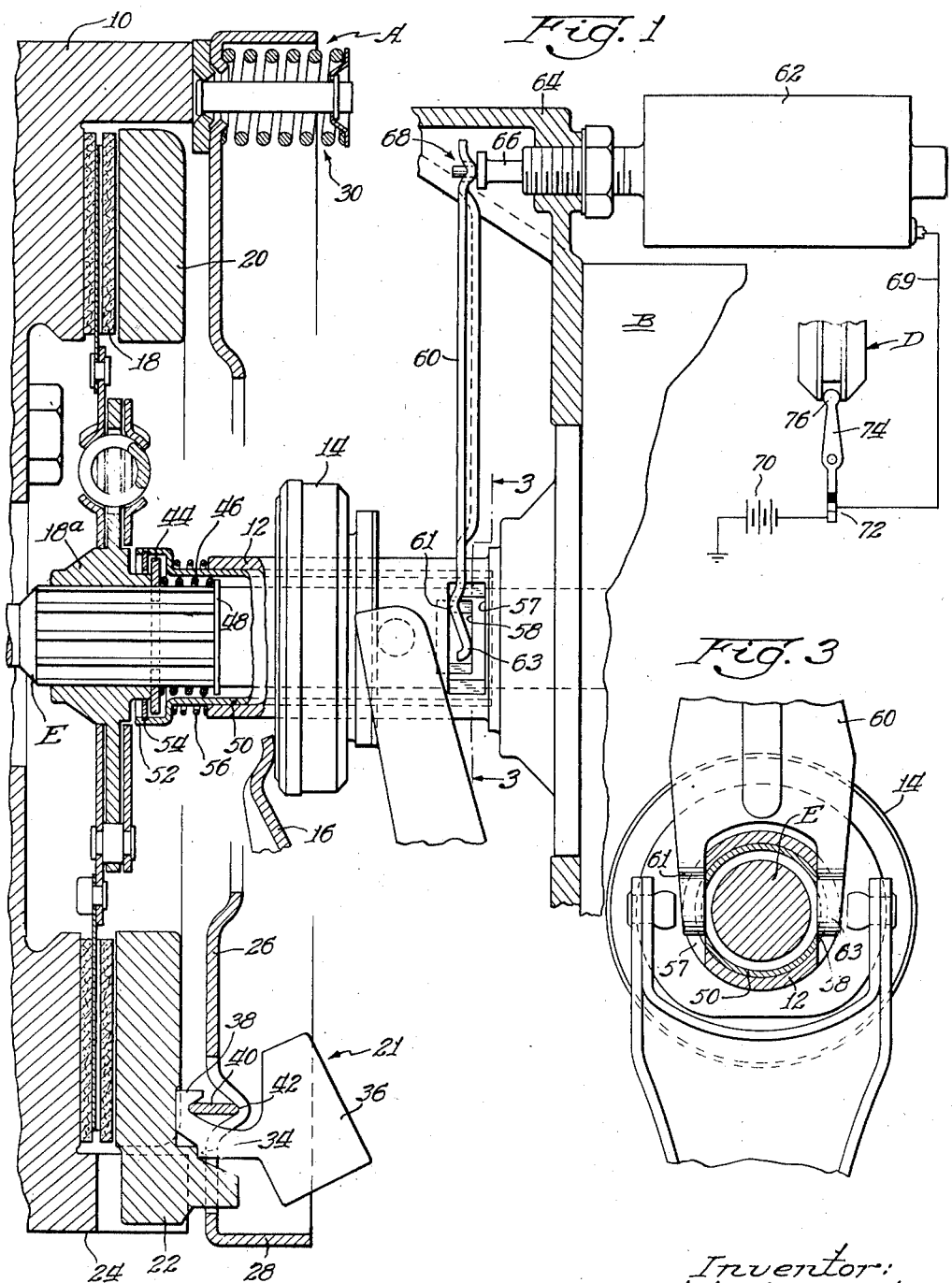

2,555,860

UNITED STATES PATENT OFFICE 2,555,860

TRANSMISSION OPERATED CONTROL OF CENTRIFUGAL CLUTCH MECHANISM

Harold V. Reed, Chicago, Ill., assignor to Borg-Warner Corporation, Chicago, Ill., a corporation of Illinois Application October 20, 1945, Serial No. 623,552

18 Claims. (Cl. 192—3.5)

1

The present invention relates to clutches and more specifically to friction clutches of the centrifugally operated type.

One of the principal objects of the present invention is to provide means for taking up the backlash incident to the engagement of the clutch disk with the driving member when such engagement is effected by centrifugally operated levers.

Heretofore one of the principal objections to the action of a centrifugal clutch has been the "bump" which often occurs when the clutch is first engaged. This bump may be compared with the sudden engagement of a manually controlled friction clutch when the driver of an automobile releases the clutch pedal too quickly. I have ascertained through experimentation that if a drag is exerted on the friction disk of a centrifugal clutch, at the time of engagement, the drive line bump is eliminated. This is due to the fact that the drag will take up all the backlash in the drive line. It was also a problem to exert this drag without experiencing the difficulty which accompanies such a condition when the operator shifts the transmission from neutral into one of the gear ratios. If the drag is exerted in the drive line when the gears are meshed this objection is removed. I have, therefore, devised means for accomplishing this function and also to remove the drag when the transmission is in neutral. In my present arrangement, the drag is intermittently effective so that it becomes active during gear mesh and will be inactive when the transmission gears are in neutral position.

It is, therefore, an object of the present invention to provide means which exert a drag on the friction disk in a centrifugal clutch assembly and to control the application and release of this drag through the medium of the shifter mechanism of the transmission assembly. In this connection the present improvements contemplate the control of the drag either through the action of a solenoid which is energized and deenergized by a switch operatively connected with the synchronizer collar of the transmission, or by the control means which may include suitable leverage actuated by the transmission shift rail. Other means, of course, may be included in the control mechanism for applying and releasing a drag on the friction disk of the centrifugal clutch.

It is preferred to accomplish the objects of this invention and to practice the same in substantially the manner hereinafter described and as more particularly pointed out in the claims. Reference is now made to the accompanying drawings that form a part of this specification in which:

Fig. 1 is a longitudinal elevation, partly in section, disclosing a form in which the present invention may be made;

Fig. 2 is a longitudinal elevation, partly in section, of another form in which the present invention may be made;

Fig. 3 is a fragmentary transverse section taken along the plane of line 3—3 on Fig. 1;

Fig. 4 is a transverse section taken along the plane of line 4—4 of Fig. 2; and

Fig. 5 is a section taken on the plane of line 5—5 on Fig. 2.

The drawings are to be understood as being more or less of a schematic character for the purpose of disclosing typical or preferred forms or embodiments of the present invention, and in these drawings like reference characters identify the same parts in the different views.

In both types shown in the drawings the clutch assembly and the drag exerting arrangement are substantially identical, and the means for actuating the control devices for the drag, although of slightly different construction, are operated by a shiftable portion of the transmission assembly.

The drawings show a typical centrifugal clutch assembly A, an automobile transmission assembly B comprising gearing adapted to be selectively meshed for effecting a plurality of vehicle driving speed ratios and including a transmission gear shift rail C (Fig. 2) which selectively moves the shift collar D (Fig. 1) of a synchronizer assembly for facilitating engagement of meshable members, such synchronizer assemblies being well known in the art and are extensively used in variable speed transmissions for automotive vehicles. The input shaft E of the transmission projects out of the usual transmission housing forwardly toward the flywheel 10 of the engine and is surrounded between the transmission housing and the clutch assembly by the bearing carrier tube 12 fixed to said housing and on which the bearing 14 is movable to actuate the clutch release levers 16. The face of the flywheel 10 provides a friction surface against which the clutch friction disk 18 is pressed by the annular pressure plate 20.

Schematically shown in Fig. 1 is a typical centrifugally responsive asembly 21 for automatically moving the pressure plate 20 to engage the friction clutch. The pressure plate has a driving connection with the flywheel 10 by means of suitable lugs 22 which are engaged between spaced projections 24 on the flywheel. A spring carrier plate 26 is suitably secured to the flywheel and has an outer peripheral wall or flange 28 and the usual retractor spring assemblies 30 coact therewith. Several centrifugally responsive assemblies 21 are employed, each including a fulcrum portion 34, a weight 36, and a work-performing toe 38 engageable with the pressure plate. A fulcrum member such as a strut 40 is interposed between the toe portion 38 and a seat 42 in the proximate region of spring carrier plate 26. When the assembly is rotated, the centrifugal action causes weight 36 to swing radially outward into engagement with the flange or rim 28 of spring carrying plate 26, such movement being effective to move the pressure plate 20 into engagement with the friction disk assembly 18 and press the latter firmly against the face of flywheel 10. This centrifugal action takes place immediately the motor is started and tends to create a jerk or bump in the drive line of the vehicle. It is to overcome this objection that I have designed the present arrangement for exerting a drag on the clutch assembly.

The arrangement contemplated herein for effecting a drag comprises a washer 44 preferably splined on the transmission input shaft E adjacent the hub region of friction clutch assembly 18. A coiled expansion spring 46 presses at one end against the washer 44 and at its other end is engaged with a snap ring 48 seated in an annular groove in the input shaft E. The spring 46 exerts pressure on the washer 44 and urges it into contact with the hub portion 18a thereby to push the driven plate forwardly into contact with the friction face of flywheel 10, thus creating a drag.

For the purpose of selectively releasing the drag, a sleeve 50 is telescoped on the shaft E between said shaft and the bearing carrier tube 12, and at its region nearest the clutch assembly said sleeve 50 is increased in diameter by providing a flared end 52 which overlies the washer 44 in the manner shown. A snap ring or the like 54 is secured to this flared overlying portion 52 between the washer 44 and hub 18a of the clutch disc to act as an abutment. A spring 56 is interposed between the end of the bearing carrier tube 12 and the shoulder or abutment formed by the flared end portion 52 of the sleeve 50 to urge the snap ring 54 normally away from the washer 44. By moving sleeve 50 longitudinally rearwardly, or toward the transmission assembly B, the snap ring 54 will be brought into contact with the washer 44 to move said washer away from hub 18a in opposition to spring 46 and thus relieve the drag. In this manner the drag through the clutch plate and flywheel is controlled to the extent that it may be rendered either active or inactive whenever desired.

The means for moving the sleeve 50 to release the drag may take various forms, preferably linkage or leverage devices of various types, and different means may be provided for actuating these devices.

In Fig. 1, the tube 12 has openings 57 in its opposite sides adjacent the transmission housing, and there are slots 58 in the sleeve 50 in registry with said openings 57. A forked lever 60 has a fulcrum 61 bearing on the edges of the openings 57 and another fulcrum 63 bearing against the edges of the slots 58. Oscillation of lever 60 on these fulcrums is adapted to shift sleeve 50 longitudinally in one direction or the other with respect to input shaft E, thereby to move the stop member or snap ring 54 into or out of engagement with the washer 44 for controlling the drag.

One means for oscillating the lever 60, shown in Fig. 1, comprises a solenoid 62 suitably mounted on the transmission housing, preferably on an embossment 64, and the armature 66 of this solenoid is operatively coupled, as at 68, to the adjacent upper end of lever 60. Electric current is supplied to the solenoid 62 by conductor 69 leading from a suitable source of current such as the battery 70, and said conductor has a suitable switch 72 interposed therein that is operated by an arm 74. The operation of this arm is accomplished by having its end 76 engaged with or suitably connected to the shiftable synchronizer collar D of the transmission assembly B. The arrangement of the switch is such that when the collar D is in position indicating that the transmission gears are meshed, either forward or reverse, the solenoid is de-energized and its armature 66 is in the position shown in Fig. 1 where the drag creating arrangement is in its active position and snap ring 54 on sleeve 50 is disengaged from washer 44. When the synchronizer collar D is shifted into neutral position and the transmission gears are unmeshed, the solenoid 62 becomes energized to swing lever 60 in the other direction and the drag exerting means are thus rendered non-active by the withdrawal of washer 44 from engagement with disc hub 18a.

The arrangement shown in Fig. 2 is similar to that above described in connection with Fig. 1 in that the drag exerting elements are identical and the control of these elements is effected by a forked lever 60a which is of the bell-crank type and fulcrumed on a pin 80 in a fixture or bracket 78 mounted on the transmission housing. The forked end of lever 60a enters the openings 57 in tube 12 and engages the slots 58 in the sides of sleeve 50. The upper portion of lever 60a has a horn-shape and its outer end formed with a foot 82 to rest upon the surface of the transmission shift rail C, the end region of which has a cam embossment 84. When shift rail C is moved to the right (Fig. 2), the transmission is in the neutral position. Cam boss 84 will engage the shoe 82 of the bell-crank 60a, thus rocking the bell-crank which swings to control the position of the sleeve 50, and in turn acts to move the snap ring into contact with washer 44 which is withdrawn from contact with disc hub 18a, thus rendering the drag-creating arrangement inactive. It will be noted that when lever shoe 82 is in contact with cam 84 the transmission is in neutral, and conversely, when shoe 82 is resting on the small diameter of the shift rail, as a result of moving the shift rail either to the right or left from neutral position, the transmission is in engaged position and the drag-creating means become active. In other words, the drag engaging arrangement should be inactive when the transmission is in neutral and should be active when the transmission is in gear.

While this invention has been described in its present preferred embodiments, it will be apparent to persons skilled in the art, after understanding the improvements, that numerous changes and modifications may be made without departing from the spirit of the invention. It is aimed in the appended claims to cover all such changes and modifications.

I claim:

1. A backlash take-up assembly comprising driving means; a clutch plate; means adapted to move said clutch plate into frictional engagement with said driving means; means for releasing said clutch plate from said driving means; driven means actuated by said clutch plate, said driven means including a shiftable member; and manually controlled means separate from and independent of said releasing means and operated by said shiftable member adapted to exert a frictional drag between said clutch plate and said driving means.

2. A backlash take-up assembly as defined in claim 1, wherein the means for frictionally engaging the clutch plate with the driving means comprises centrifugally responsive lever members.

3. A backlash take-up assembly comprising driving means; a clutch plate; means adapted to move said clutch plate into frictional engagement with said driving means; release means for said clutch plate; driven means actuated by said clutch plate, said driven means including a member shiftable into at least two positions; and manually controlled means separate from and independent of said release means and operated by said shiftable member adapted in one position of said member to exert a frictional drag between said clutch plate and said driving means, and in another position of said member to relieve said drag.

4. A backlash take-up assembly as defined in claim 3, wherein the means for frictionally engaging the clutch plate with the driving means comprises centrifugally responsive lever members.

5. A backlash take-up assembly comprising driving means; a clutch plate; centrifugally responsive means adapted to move said clutch plate into frictional engagement with said driving means; change-speed gearing driven by said clutch plate and including a shiftable synchronizer collar member for selectively coupling said gearing in different speed ratios, and being movable to a neutral position with respect to said gearing between changes of speed ratios; and manually controlled means operated by said collar member adapted in gear engaged position of said collar to exert a drag between said clutch plate and said driving means, and in neutral position of said collar to relieve said drag.

6. A backlash take-up for a clutch and transmission comprising a driving member; a clutch plate; centrifugally responsive means adapted to move said clutch plate into frictional engagement with said driving member; a transmission assembly driven by said clutch plate, said assembly including change-speed gearing and a shiftable synchronizer collar for selectively coupling said gearing in different speed ratios and being movable to a neutral position between the change of speeds of said gearing; and means operated by the movement of said synchronizing collar to its neutral position adapted to exert a drag between said friction plate and said driving member.

7. A backlash take-up for a clutch and transmission comprising a driving member; a clutch plate; centrifugally responsive means adapted to move said clutch plate into frictional engagement with said driving member; a shaft driven by said clutch plate; torque transmitting gearing actuated by said shaft adapted to be selectively meshed for different speed ratios; a shiftable synchronizer collar for effecting different speed ratios of said gearing, and being movable to a neutral position between the change of speed ratios of said gearing; and means adapted to exert a drag between said friction plate and driving member when said gearing is in mesh and to relieve said drag when said collar is in neutral position.

8. A backlash take-up assembly comprising driving means; a clutch plate; means adapted to move said clutch plate into frictional engagement with said driving means; driven means actuated by said clutch plate, said driven means including a driven shaft and a transmission gearing assembly adapted to be selectively meshed from neutral into different speed ratios and having a shift member; and means adapted to exert a drag between said clutch plate and said driving means, said last-named means comprising a washer; means pressing said washer into engagement with the hub region of said clutch plate to urge said plate into frictional contact with said driving means whereby to exert a drag between said plate and driving means when said gearing is meshed in a speed ratio; and means operable by said gearing shift member to relieve said drag when said gearing is in neutral.

9. A backlash take-up assembly as defined in claim 8, wherein the means for frictionally engaging the clutch plate with the driving means comprises centrifugally responsive lever members.

10. A backlash take-up arrangement comprising a rotatable flywheel; a driven shaft; a clutch plate on said shaft; centrifugally responsive means for frictionally engaging said clutch plate with said flywheel; a transmission shift rail adapted for longitudinal reciprocal movement; means on said driven shaft for exerting a drag between said clutch plate and said flywheel; and means operatively connecting said drag exerting means to said shift rail whereby said drag exerting means is rendered respectively active and inactive.

11. A backlash take-up arrangement comprising drive means; a driven shaft; a clutch plate on said driven shaft; centrifugally responsive means for effecting frictional engagement of said clutch plate with said drive means; a transmission shift rail adapted for longitudinal reciprocal movement; an annular member on said shaft and movable to engage against the hub region of said clutch plate for exerting a drag between said hub region and said drive means; a sleeve telescoped on said driven shaft adapted for movement in a direction to retract said annular member away from said clutch plate; and lever means operatively connecting said shift rail and sleeve whereby movement of said shift rail is adapted to control the application of drag on said clutch plate.

12. A backlash take-up arrangement comprising drive means; a driven shaft; a clutch plate on said driven shaft; centrifugally responsive means for effecting frictional engagement of said clutch plate with said drive means; an annular member on said shaft yieldably urged against the hub region of said clutch plate for exerting a frictional drag between said plate and said driving means thereon; a sleeve telescoped on said driven shaft adapted for movement in a direction to withdraw said annular member from said clutch plate; lever means for moving said sleeve; a solenoid adapted to actuate said lever; means supplying current to energize said solenoid; a switch interposed in said current supplying means; and a transmission synchronizer collar having operative connection with said switch and adapted for reciprocal movement to open and close said switch whereby to control the application and release of drag between said clutch plate and said drive means relative to the position of said synchronizer collar.

13. A backlash take-up assembly comprising driving means; a clutch plate; centrifugally responsive first means effective to move said clutch plate into frictional engagement with said driving means; release levers for said clutch plate; a manually actuated member; and a second means, separate from and operative independent of said release levers, by said manually actuated member to effect frictional engagement between said clutch plate and said driving means independent of said centrifugally responsive first means.

14. A backlash take-up assembly comprising driving means adapted to be connected to a power transmission train; a clutch plate; centrifugally responsive means adapted to move said clutch plate into frictional engagement with said driving means to connect said driving means to said power transmission train; release levers for said clutch plates; means effective to provide frictional engagement between said clutch plate and said driving means independent of said centrifugally responsive means; and means separate from and operated independent of said release levers by said manually actuated member and effective to render said first mentioned frictional engagement operative when the power transmission train is connected, and being ineffective when the power transmission train is disconnected.

15. A backlash take-up assembly comprising driving means adapted to be connected to a power transmission train; a clutch plate; speed responsive means adapted to move said clutch plate into frictional engagement with said driving means; lever means for releasing said clutch from said driving means; means effective to provide frictional engagement between said clutch plate and said driving means independent of said speed responsive means; a manually actuated member; and means separate from and operated independent of said lever means by said manually actuated member to render said frictional engagement operative when said power transmission train is connected, and being inoperative when the power transmission train is disconnected.

16. A backlash take-up assembly comprising driving means; a friction clutch plate; means for moving said clutch plate into frictional engagement with said driving means; lever means operable to release said clutch plate from said driving means; manually operable means for moving said lever means; driven means actuated by said clutch plate; said driven means comprising a shiftable member; and separate means independent of said release lever means and operated by said shiftable member for imparting a frictional drag between said clutch plate and said driving means subsequent to release of said clutch plate by said lever means.

17. A backlash take-up assembly comprising driving means; a friction clutch plate adapted to engage said driving means; a pressure plate movable in a direction to engage said clutch plate with said driving means; release levers operable to move said pressure plate in a direction away from said clutch plate, thereby to release said clutch plate from said driving means; a thrust bearing movable in a direction to operate said lever means thereby to release said clutch plate; manually operable means for moving said thrust bearing; driven means actuated by said clutch plate and surrounded by said thrust bearing; a shiftable member; separate means independent of said release levers and said thrust bearing, and operated by said shiftable member for imparting a frictional drag between said clutch plate and said driving means subsequent to the release of said pressure plate by said lever means.

18. A backlash take-up arrangement comprising a rotatable flywheel; a driven shaft; a clutch plate on said shaft; centrifugally responsive means for frictionally engaging said clutch plate with said flywheel; a movable transmission member; means on said driven shaft for exerting a drag between said clutch plate and said flywheel; and means operatively connecting said drag exerting means to said movable transmission member to render said drag exerting means respectively active and inactive.

HAROLD V. REED.

REFERENCES CITED

The following references are of record in the file of this patent:

UNITED STATES PATENTS

| Number | Name | Date |
|---|---|---|
| 2,072,117 | Lewis | Mar. 2, 1937 |
| 2,328,090 | Nutt | Aug. 31, 1943 |
| 2,328,092 | Nutt | Aug. 31, 1943 |
| 2,428,892 | Plepico | Oct. 14, 1947 |